(No Model.) 5 Sheets—Sheet 4.

C. W. KINDER.
FORCE PUMP.

No. 377,833. Patented Feb. 14, 1888.

WITNESSES.
J. M. Dolan.
Fred. B. Dolan.

INVENTOR.
Claude W. Kinder,
by his atty
Clarke H. Raymond.

(No Model.) 5 Sheets—Sheet 5.

C. W. KINDER.
FORCE PUMP.

No. 377,833. Patented Feb. 14, 1888.

WITNESSES_
J. M. Dolan.
Fred. B. Dolan.

INVENTOR_
Claude W. Kinder,
by his atty.
Clarke & Raymond.

UNITED STATES PATENT OFFICE.

CLAUDE W. KINDER, OF TIEN-TSIN, CHIHLI, CHINA.

FORCE-PUMP.

SPECIFICATION forming part of Letters Patent No. 377,833, dated February 14, 1888.

Application filed October 14, 1886. Serial No. 216,210. (No model.)

*To all whom it may concern:*

Be it known that I, CLAUDE W. KINDER, of Tien-Tsin, in the Province of Chihli, North China, a subject of Victoria, Queen of Great Britain and Ireland, have invented a new and useful Improvement in Force-Pumps, of which the following is a full, clear, and exact description, reference being had to the accompanying drawings, forming a part of this specification, in explaining its nature, in which—

Figure 1:
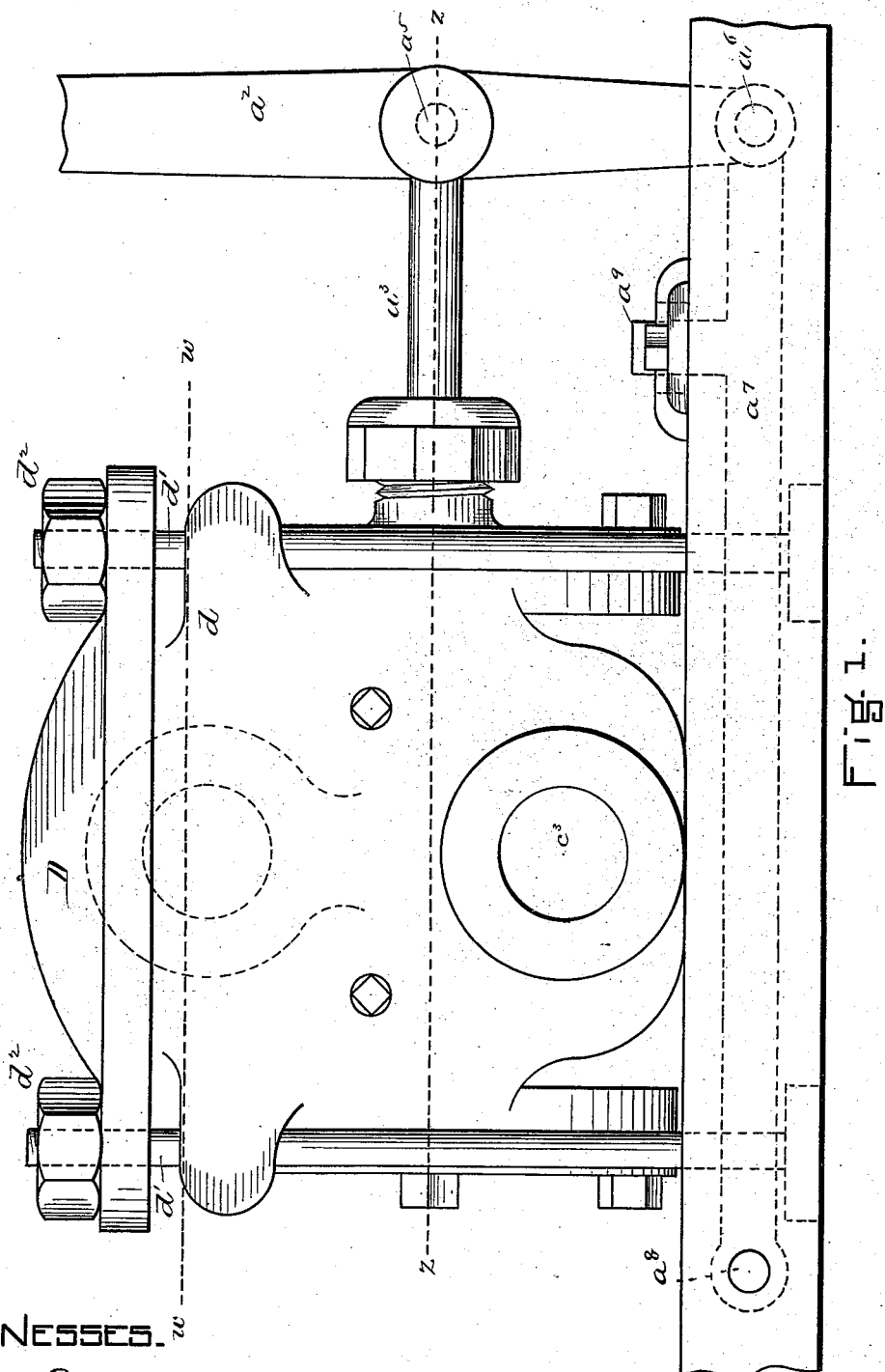
Figure 2:
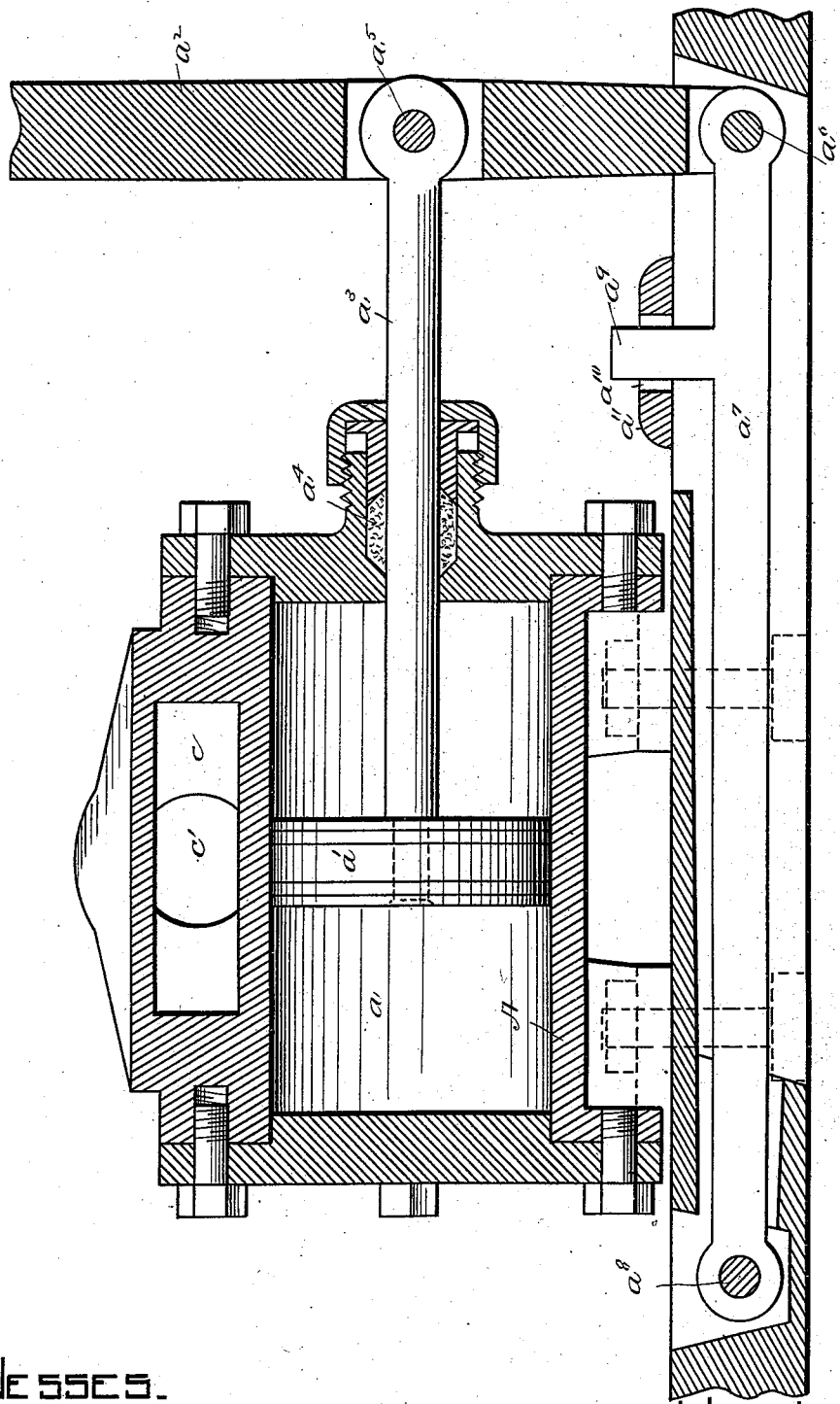
Figure 3:
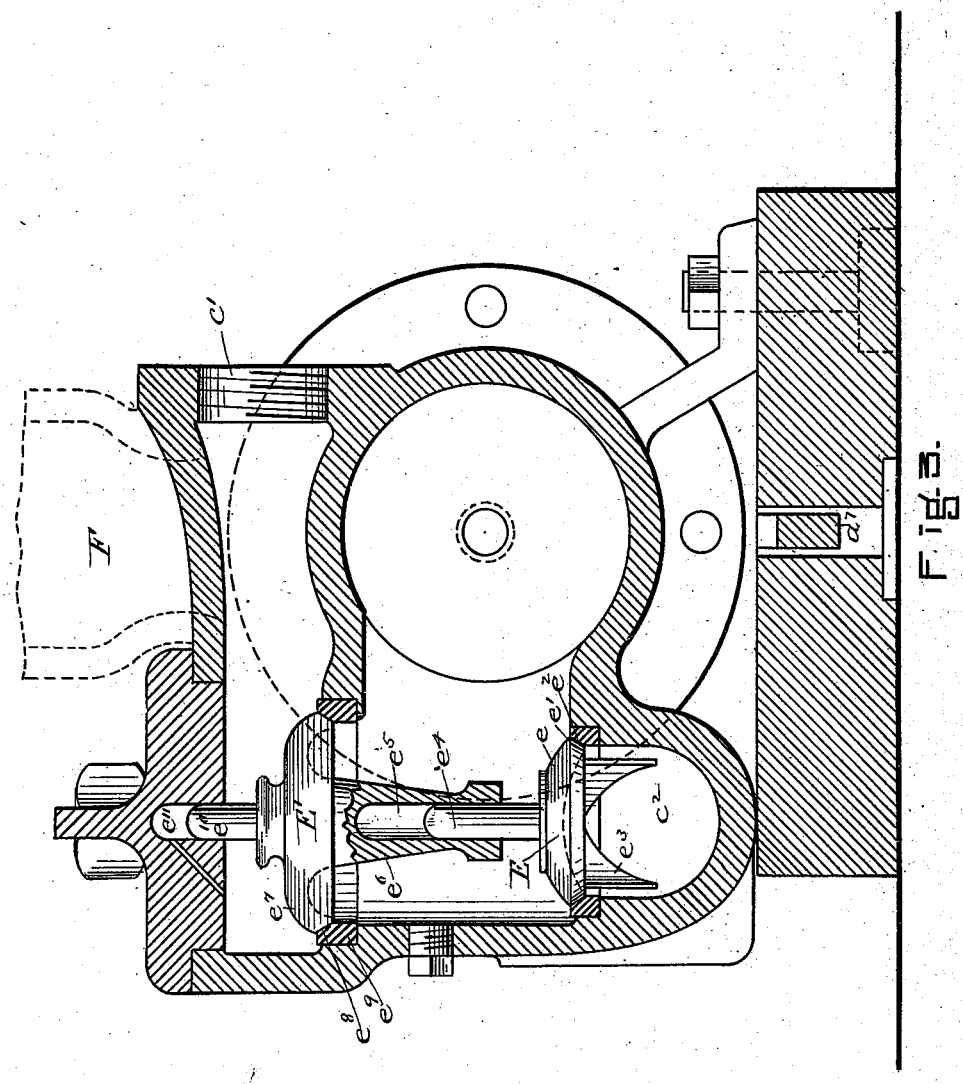
Figure 4:
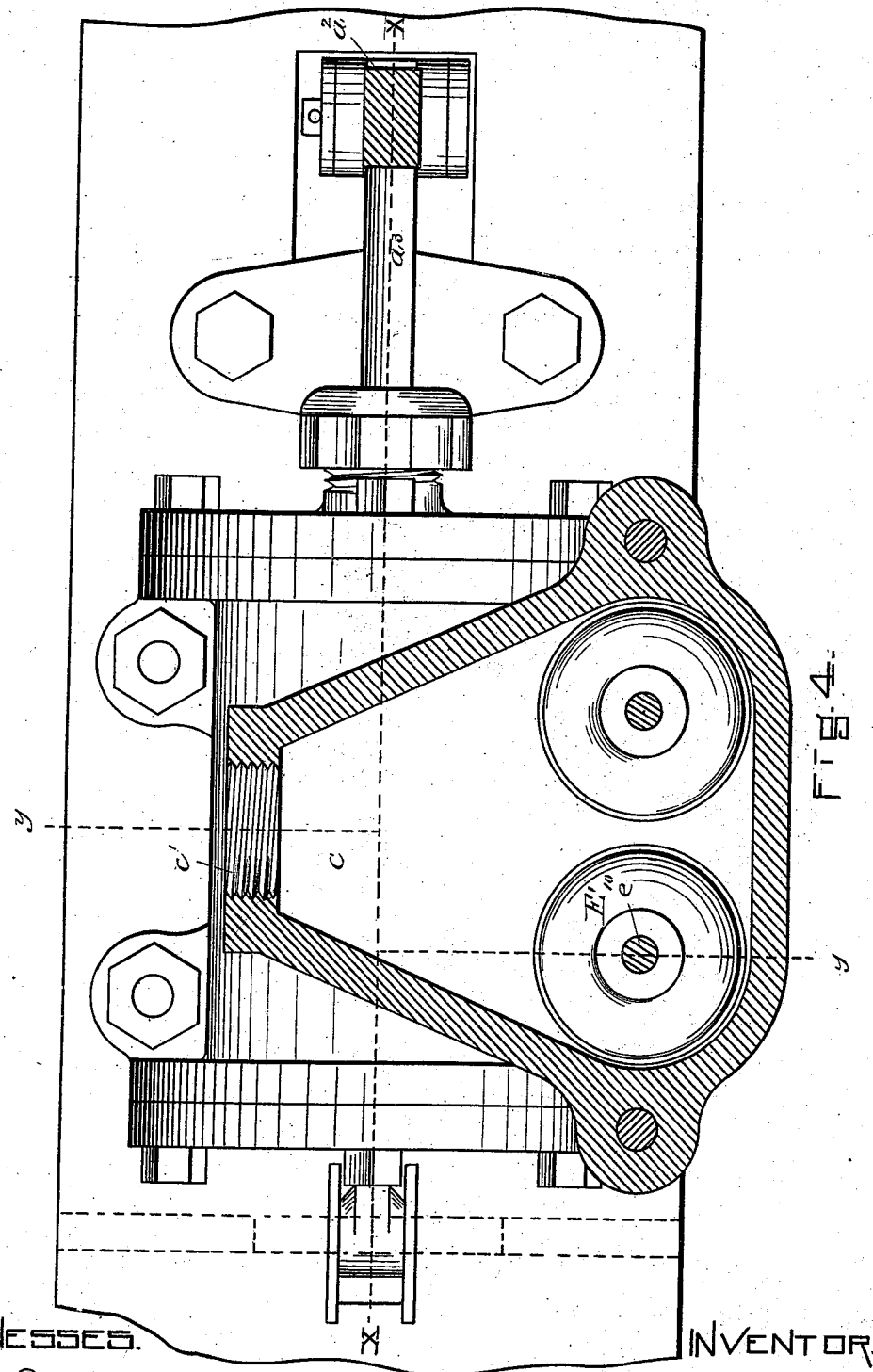
Figure 5:
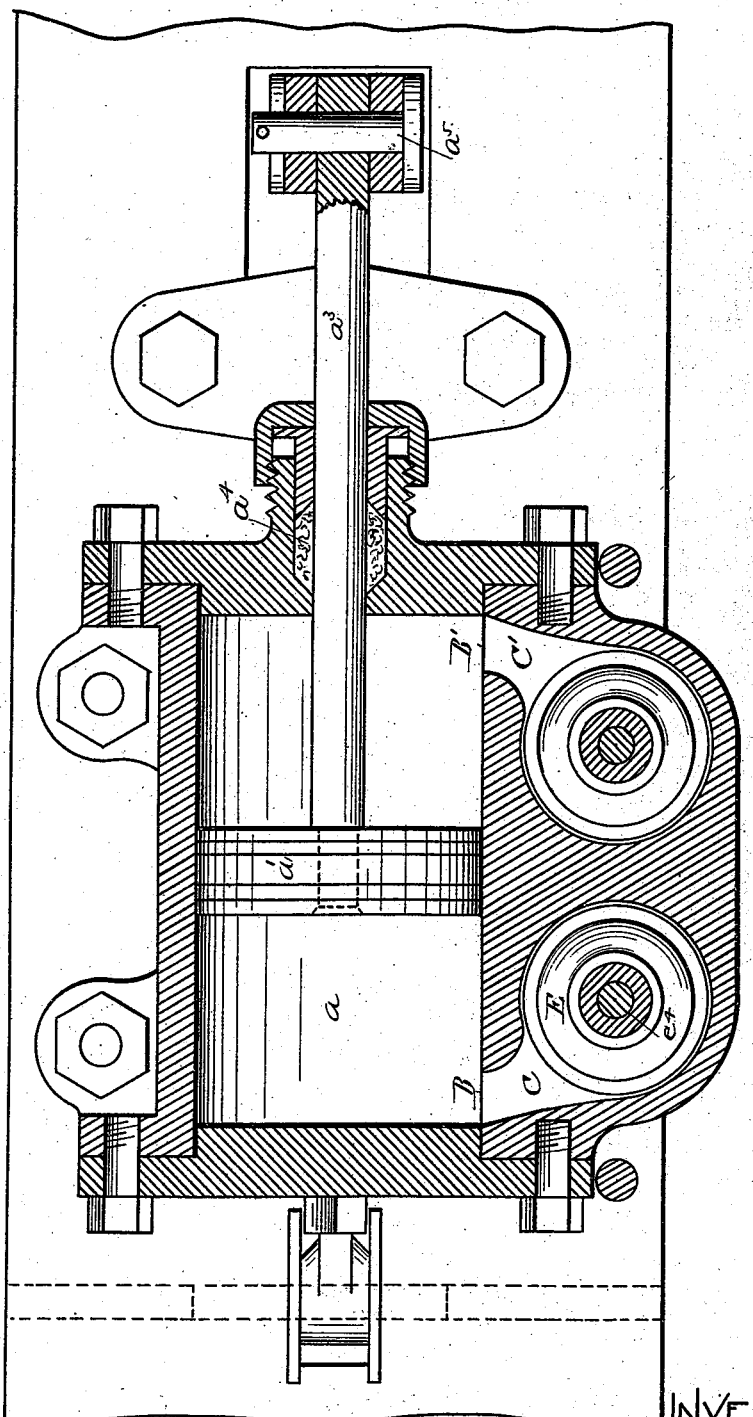

Figure 1 is a side elevation of the pump. Fig. 2 is a section upon the line $x\ x$ of Fig. 4. Fig. 3 is a section upon the line $y\ y$ of Fig. 4. Fig. 4 is a section upon the line $w\ w$ of Fig. 1. Fig. 5 is a section upon the line $z\ z$ of Fig. 1.

The invention relates to a force-pump the piston of which is adapted to be operated by a long lever and a long radius-bar, to the end of which the lever is connected, and which radius-bar has a steadying horn or arm which enters a hole in a suitably-placed plate, the construction being especially adapted to relieve the piston-rod from a straining or cramping action.

In the drawings, A is the cylinder; $a$, the piston-chamber; $a'$, the piston. It is connected with the long lever $a^2$ by the spindle $a^3$, which passes through the gland $a^4$, and is connected by the stud or pin $a^5$ with the lever or bar. This lever $a^2$ is connected at its lower end, $a^6$, to the long radius-bar $a^7$, which extends beneath the cylinder, and is pivoted at $a^8$ at the other end thereof. It has an arm or horn, $a^9$, which extends upward to enter the hole $a^{10}$ in the steady-plate $a^{11}$. By this construction of long radius-bar and steady arm or horn the friction of the spindle in the gland is very much diminished, so that the wear of the gland and spindle are decreased and the piston worked more easily. It will be seen that the horn or arm $a^9$ keeps the radius-bar steady in spite of its length, and prevents any binding action on the pump-spindle.

The piston-chamber $a$ is connected at one end by the port B with the valve-chamber C, and at its other end by the port B' with the valve-chamber C'. The valve-chambers C C' open into each other at $c$, (see Fig. 2,) which has the outlet $c'$. The valve-chambers are also connected at their lower end by the passage $c^2$, which has the inlet $c^3$. The valve-chambers are covered by a cap, D, (see Fig. 1,) which is fastened upon the casing $d$ of the chambers by the bolts $d'$ and nuts $d^2$, two bolts being sufficient for this purpose. The removal of this cap D exposes the two sets of valves, there being in each valve-chamber a valve which closes the inlet-passage and a valve which closes the outlet-passage therefrom. Each set of valves is the same in construction, and one set is well shown in Fig. 3, and the relation which they bear to each other is represented in Figs. 4 and 5.

The inlet-valves E, or valves for closing the inlet-passages, each comprise a head, $e$, having an inclined seat, $e^2$. It has the guiding extension or follower $e^3$ and the stud or spindle $e^4$, which extends upward into a hole, $e^5$, in the downward extension $e^6$ from the outlet-valve E'. This outlet-valve has a head, $e^7$, having the valve-seat $e^8$, which closes against the packing-ring or stationary seat $e^9$, and it may have a spindle, $e^{10}$, to enter the recess or hole $e^{11}$ in the cap D. The inlet-valve E has a somewhat greater throw than the outlet-valve E'; but as the outlet-valve is made larger than the inlet-valve it permits both valves to be removed upon the unbolting and removal of the cap D, so that the interior of the pump can be easily reached, the valves readily removed, and parts repaired.

The air chamber F may be arranged to connect with the outlet-passage $c$, as represented in Fig. 3.

Having thus fully described my invention, I claim and desire to secure by Letters Patent of the United States—

The combination of the piston-chamber $a$, the piston $a'$, the spindle $a^3$, long lever $a^2$, the long radius-bar $a^7$, to the end of which the lever $a^2$ is connected, a horn or arm, $a^9$, the steadying-plate $a^{11}$, having the hole $a^{10}$, which receives the horn or arm $a^9$, substantially as described.

CLAUDE W. KINDER.

Witnesses:
R. M. BROWN,
FR. KYD AITKEN.